United States Patent
Nandy et al.

(10) Patent No.: US 11,671,348 B2
(45) Date of Patent: Jun. 6, 2023

(54) METHOD AND SYSTEM FOR FACILITATING EFFICIENT MULTICAST FORWARDING OVER TUNNELS

(71) Applicant: Hewlett Packard Enterprise Development LP, Houston, TX (US)

(72) Inventors: Tathagata Nandy, Bangalore (IN); Chethan Chavadibagilu Radhakrishnabhat, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 196 days.

(21) Appl. No.: 17/079,453

(22) Filed: Oct. 24, 2020

(65) Prior Publication Data
US 2022/0131786 A1    Apr. 28, 2022

(51) Int. Cl.
*H04L 45/16*    (2022.01)
*H04L 45/64*    (2022.01)

(52) U.S. Cl.
CPC ............. *H04L 45/16* (2013.01); *H04L 45/64* (2013.01)

(58) Field of Classification Search
CPC ................................ H04L 45/16; H04L 45/64
See application file for complete search history.

(56) References Cited

U.S. PATENT DOCUMENTS

| 2015/0055651 | A1* | 2/2015 | Shen | H04L 12/1854 |
| | | | | 370/390 |
| 2017/0195127 | A1* | 7/2017 | Zhou | H04L 12/6418 |
| 2018/0270146 | A1* | 9/2018 | Jiang | H04L 45/16 |
| 2021/0234714 | A1* | 7/2021 | Govindan | H04L 41/5019 |

OTHER PUBLICATIONS

Behringer et al., "Using Only Link-Local Addressing inside an IPv6 Network", Internet Engineering Task Force, RFC 7404, Nov. 2014, pp. 1-10.
Christensen et al., "Considerations for Internet Group Management Protocol (IGMP) and Multicast Listener Discovery (MLD) Snooping Switches," Network Working Group, RFC 4541, May 2006, pp. 1-16.
Mahalingam et al., "Virtual extensible Local Area Network (VXLAN): A Framework for Overlaying Virtualized Layer 2 Networks over Layer 3 Networks", RFC 7348, Aug. 2014, pp. 1-22.

* cited by examiner

*Primary Examiner* — Walli Z Butt
(74) *Attorney, Agent, or Firm* — Park, Vaughan, Fleming & Dowler LLP

(57) ABSTRACT

A system that can facilitate multicast forwarding via overlay multicast tunnels in a network is provided. The system can operate as a tunnel endpoint and form a first overlay tunnel with a peer tunnel endpoint. During operation, the system can receive a join request for a multicast group via the first overlay tunnel. The system can identify a local port of the system associated with the multicast group indicated by the join request. The system can then include the first overlay tunnel in a set of forwarding tunnels for multicast traffic of the multicast group based on the join request. Subsequently, the system can forward the multicast traffic of the multicast group received from a local port via the set of forwarding tunnels, thereby limiting forwarding of the multicast traffic to tunnel endpoints associated with the multicast group.

18 Claims, 8 Drawing Sheets

METHOD AND SYSTEM FOR FACILITATING EFFICIENT MULTICAST FORWARDING OVER TUNNELS

BACKGROUND

Field

The present disclosure relates to communication networks. More specifically, the present disclosure relates to a method and system for facilitating efficient multicast forwarding across overlay tunnels.

BRIEF DESCRIPTION OF THE FIGURES

In the figures, like reference numerals refer to the same figure elements.

DETAILED DESCRIPTION

Figure 1A:
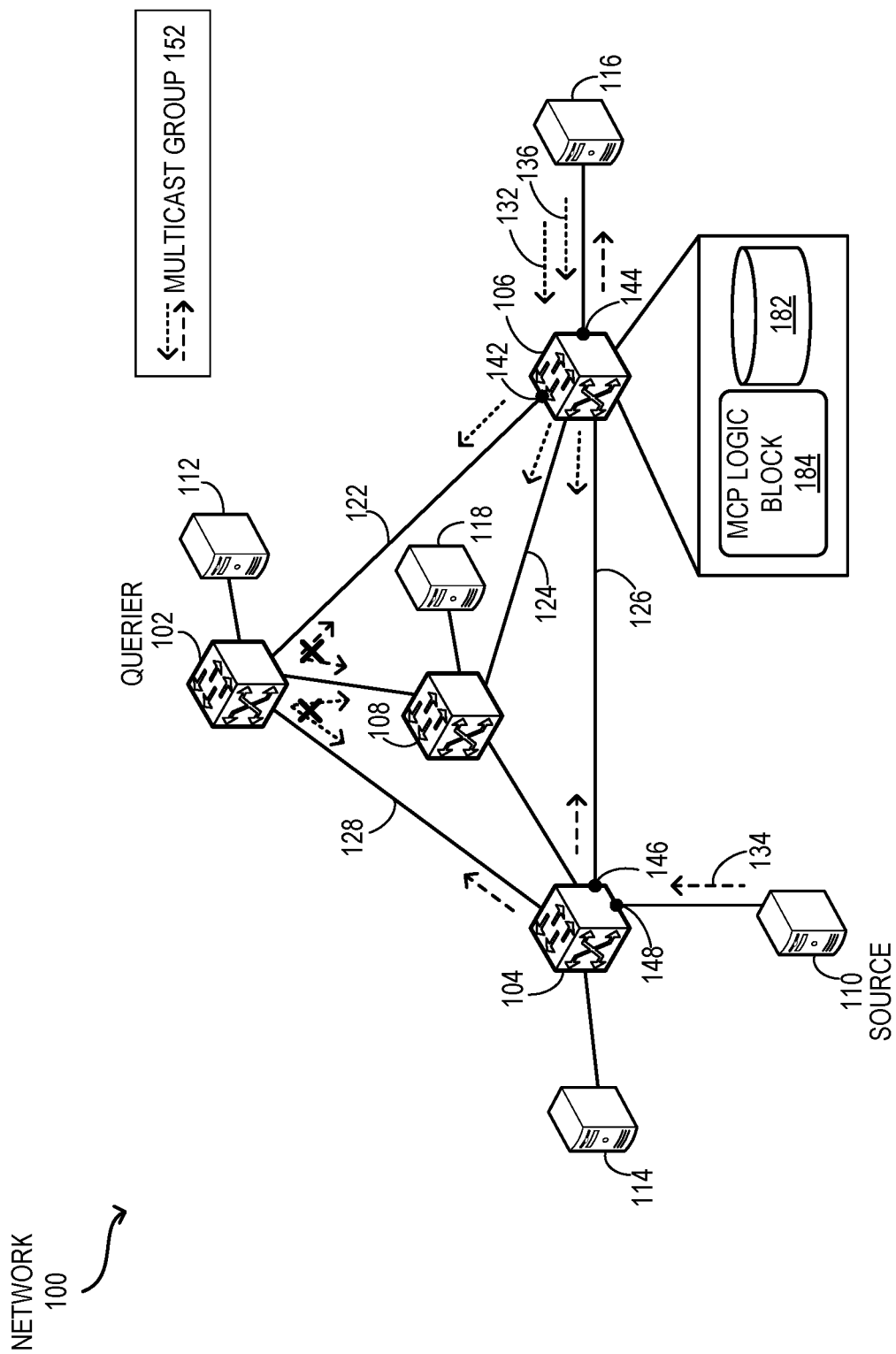
FIG. 1A illustrates an exemplary network supporting efficient multicast forwarding across overlay tunnels, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

The Internet is the delivery medium for a variety of applications running on physical and virtual devices. Such applications have brought with them an increasing demand for content. As a result, equipment vendors race to build switches capable of delivering content efficiently. The resulting complexity of the switch can increase the difficulty of efficiently forwarding certain types of traffic. For example, a switch can selectively forward multicast packets comprising requested content (e.g., a video stream) to hosts subscribing to a corresponding multicast group. However, some network architecture, such as overlay tunnels, may cause inefficient forwarding of multicast traffic.

A host may use a multicast requesting protocol, such as Internet Group Management Protocol (IGMP) and Multicast Listener Discovery (MLD), to subscribe to a multicast group and receive associated multicast traffic. Therefore, IGMP and MLD are often considered as first-hop router protocols. IGMP and MLD join requests are forwarded by the switches to upstream routers to notify the upstream routers regarding the requesting host's presence. Accordingly, the routers forward the multicast data traffic. However, if the forwarding is performed via an overlay tunnel, which can distribute a layer-2 network across layer-3 domains, the multicast data traffic can become restricted and may lead to a traffic black hole.

One embodiment of the present invention provides a system that can facilitate multicast forwarding via overlay multicast tunnels in a network. The system can operate as a tunnel endpoint and form a first overlay tunnel with a peer tunnel endpoint. During operation, the system can receive a join request for a multicast group via the first overlay tunnel. The system can identify a local port of the system associated with the multicast group indicated by the join request. The system can then include the first overlay tunnel in a set of forwarding tunnels for multicast traffic of the multicast group based on the join request. Subsequently, the system can forward the multicast traffic of the multicast group received from a local port via the set of forwarding tunnels, thereby limiting forwarding of the multicast traffic to tunnel endpoints associated with the multicast group.

In a variation on this embodiment, the system can receive data traffic of the multicast group from the local port from a source of the multicast group.

In a variation on this embodiment, the set of forwarding tunnels includes (i) a tunnel to a querier for multicast snooping in the network, and (ii) one or more tunnels from which a multicast join request for the multicast group have been received.

In a variation on this embodiment, the system can receive a second join request for a second multicast group from a multicast subscriber host via a local port. The system can then forward the second join request to a respective peer tunnel endpoint of the system via a corresponding tunnel.

In a variation on this embodiment, the system can obtain information associated with the first overlay tunnel from a relational database of the system.

In a variation on this embodiment, the multicast join can be based on an Internet Group Management Protocol (IGMP) or a Multicast Listener Discovery (MLD) protocol.

In a variation on this embodiment, the system can select the system as a querier based on a set of performance parameters associated with the multicast group and the system. The system can then configure the first tunnel endpoint as the querier for the network.

In a variation on this embodiment, the system can maintain an individual set of forwarding tunnels for a respective multicast group.

In a variation on this embodiment, the system can generate an entry in a multicast forwarding table of the system in response to receiving the join request. The entry can include tunnel information associated with the first overlay tunnel. The system can then identify the set of forwarding tunnels based on the multicast forwarding table.

In a variation on this embodiment, the system can receive a leave request for the multicast group via the first overlay tunnel and determine whether a subscriber host of the multicast group is reachable via the first overlay tunnel. If no subscriber host of the multicast group is reachable via the first overlay tunnel, the system can remove the first overlay tunnel from the set of forwarding tunnels.

The embodiments described herein solve the problem of efficiently forwarding multicast traffic across overlay tunnels by allowing a tunnel endpoint switch, which can be referred to as an endpoint, to (i) forward multicast control messages to a respective peer endpoint using corresponding tunnels, and (ii) forward multicast traffic to peer endpoints from which a join request has been received. Such comprehensive forwarding of multicast control traffic and selective forwarding of multicast data traffic can ensure that each peer endpoint that requested multicast traffic receives the requested traffic from the tunnel between the endpoint and the peer endpoint.

With existing technologies, multicast snooping (e.g., IGMP/MLD snooping) can be enabled for a switch in a network. As a result, the switch can identify a multicast packet of a multicast group and forward the packet to the network segment where there are subscriber hosts for the multicast group. In this way, multicast snooping can restrict multicast traffic flow to the relevant network segments and facilitate effective utilization of available network bandwidth. When multicast snooping is enabled, the network can include a querier switch (or a querier). The querier can obtain a group membership query (e.g., an IGMP query, such as an IGMP join request) from another switch and send the query toward the source of the multicast group (e.g., through a network facilitating Protocol-Independent Multicast (PIM)). The querier may also receive membership reports from hosts participating in a multicast group.

Since the querier can send the join request for a multicast group, the multicast traffic can be directed to the querier, which can forward the traffic to the requesting switch. However, the switches in the network can be coupled to each other via overlay tunnels. An overlay tunnel can be established between two tunnel endpoints based on a tunneling protocol and extend a layer-2 network across layer-3 domains. To forward traffic using the tunnel, an endpoint may encapsulate a packet using a higher-layer tunnel encapsulation header. The endpoint can include a set of inter-switch ports and a set of host ports. The endpoint can be coupled to another switch using an inter-switch port. Consequently, the endpoint can form the tunnel with another endpoint and forward traffic to that endpoint using a corresponding inter-switch port. The endpoint can be coupled to hosts (e.g., user devices) via host ports. The endpoint can receive a multicast query (e.g., an IGMP join request) from a host port.

For example, the endpoint can encapsulate an Ethernet packet using an Internet Protocol (IP)-based tunneling header associated with the tunneling protocol. Examples of a tunneling protocol can include, but are not limited to, generic routing encapsulation (GRE) or a variation thereof (e.g., Network Virtualization using GRE (NVGRE)), virtual extensible local area network (LAN) (VXLAN), OpenVPN (virtual private network), and IP Security (IPsec). If an overlay tunnel is formed based on VXLAN, the two endpoints of that tunnel can be virtual tunnel endpoints (VTEPs).

If the switches are coupled to each other via overlay tunnels, the requesting hosts (e.g., the receivers), multicast servers (e.g., the sources), and the querier can be spread across different layer-2 segments. Consequently, the querier may receive multicast traffic from a source from one tunnel and may need to forward the traffic to another tunnel to a host. However, to prevent loops across endpoints, forwarding between tunnels may operate based on split-horizon rules, which can block traffic received from one tunnel to another tunnel. As a result, with split-horizon rules in operation, the querier may not forward multicast traffic to the host. This can cause a multicast traffic black hole (i.e., traffic blockage) in the network.

To solve this problem, a respective endpoint in a network can support comprehensive forwarding of multicast control traffic and selective forwarding of multicast data traffic. A respective endpoint can maintain a database (e.g., a switch-specific specialized relational database) in the local storage device. The endpoint can maintain the virtual network identifiers, such as VNIs, tunnel information, and associated port configuration in the database. The multicast processing logic block of the endpoint, which can be a multicast daemon running on the endpoint, can obtain the tunneling information from the database. This allows the endpoint to process multicast control and data traffic based on the tunnel configurations.

When a querier is configured in a network, the querier can send an all host query (AHQ) to ports, including the inter-switch ports, configured with an associated VLAN. Consequently, the AHQ is also sent to the tunnels. Upon receiving the AHQ, the receiving switch can mark the inter-switch port as a querier port. If the switch is a peer endpoint of the querier (i.e., a tunnel exists between the querier and the switch), the AHQ can be received from the tunnel. Otherwise, the inter-switch port can be a regular layer-2 port. A respective switch in the network can maintain information indicating the ports through which multicast traffic can be accessible (e.g., where PIM switches are located).

During operation, an endpoint can receive a packet indicating a join request for receiving traffic of a multicast group from a host port. The endpoint may perform multicast snooping on the packet to determine that the packet includes a join request. The endpoint can then mark the host port for forwarding multicast traffic belonging to the multicast group. To do so, the endpoint can maintain a multicast forwarding table that maps respective identifiers of the multicast group and the host port. The endpoint can then forward the join request to the querier (e.g., via a querier port), detected ports, administratively configured forwarding ports, and all ports that participate in a tunnel. As a result, even if a peer endpoint is not in the path to the source of the multicast group (i.e., not in the multicast tree that distributes the multicast traffic of the multicast group), the endpoint can receive the join request. In other words, the endpoint employs a comprehensive forwarding policy for join requests.

Similar to join requests, to leave a multicast group, a host may send a multicast leave request (e.g., an IGMP leave request) for the multicast group. Upon receiving the leave request from a host port, an endpoint can forward the leave request to a respective tunnel. This allows the peer endpoints to stop tracking multicast groups that may not have a subscriber host. Unless another subscriber host is reachable via the tunnel, the source endpoint may no longer forward data traffic to the tunnel. Furthermore, upon receiving the leave request, the querier can send group-specific query (GSQ) and/or group-and-source-specific query (GSSQ) packets for the multicast group to a respective tunnel. If any other host remain in the multicast group, the host can send a membership report, thereby notifying the corresponding endpoint that multicast traffic should continue to flow to that endpoint.

Upon receiving the join request from a tunnel, the peer endpoint can track the multicast group and the tunnel information. For example, the endpoint can maintain a mapping between a tunnel identifier of the tunnel and a group identifier of the multicast group. This allows the endpoint to determine from which tunnel a join request for a particular multicast group has been received. Consequently, if the endpoint receives multicast traffic for the multicast group (e.g., if the endpoint is coupled to the source via a host port), the endpoint can forward the traffic to the tunnel via which the join request has been received. An endpoint coupled to a source can be referred to as a source endpoint. The endpoint, thus, can prevent the flow of multicast traffic to unassociated tunnels and support selective forwarding of multicast data traffic. It should be noted that the endpoint may also forward the multicast traffic to the querier via another tunnel, even if the querier is not locally coupled to a host subscribing to the multicast group (i.e., a subscriber).

To restrict the distribution of multicast control and data packets, and prevent looping of packets in a mesh topology, the network can deploy split-horizon rules for the endpoints. As a result, even if an endpoint receives a join request from a tunnel, the endpoint may not forward that join request to another tunnel. Consequently, even when an endpoint forwards a join request to each peer endpoint using a corresponding tunnel, the peer endpoint would not forward that join request to another tunnel. Similarly, even when an endpoint (e.g., a querier) receives multicast traffic from a tunnel, the endpoint would not forward that traffic to another tunnel. The join requests are infrequent and small, and the data packets are frequent (e.g., often as a packet stream) and large. Hence, comprehensive forwarding for join requests may introduce little overhead in the network, while selective forwarding for data traffic can preserve network bandwidth. In this way, the endpoints in the network can ensure efficient multicast traffic forwarding.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," "datagram," or "transaction."

Network Architecture

FIG. 1A illustrates an exemplary network supporting efficient multicast forwarding across overlay tunnels, in accordance with an embodiment of the present application. As illustrated in FIG. 1, a network 100 includes switches 101, 102, 103, and 104. A respective switch pair in network 100 can be coupled to each other with a tunnel, and hence, network 100 can be an overlay network over an underlying physical network. Therefore, a respective switch in network 100 can also be referred to as an endpoint. Here, switch 102 can be coupled to switch 104 via tunnel 128. Therefore, switches 102 and 104 can be the endpoints of tunnel 128. Similarly, switch 106 can be coupled to switch 102, 108, and 104 via tunnels 122, 124, and 126, respectively. Hosts 110 and 114 can be coupled to and reachable from switch 104. Similarly, hosts 112, 116, and 118 can be coupled to switches 102, 106, and 108, respectively. A host can be a user device (e.g., a multicast subscriber) or a server (e.g., a multicast server).

Since a tunnel may span multiple networking devices, a respective tunnel in network 100 may span other switches. For example, tunnel 128 may span one or more switches between switches 102 and 104 that are not shown in FIG. 1. A respective endpoint, such as endpoint 106, can encapsulate an Ethernet packet using an IP-based tunneling header of a corresponding tunneling protocol. Examples of a tunneling protocol can include, but are not limited to, GRE or a variation thereof (e.g., NVGRE), VXLAN, OpenVPN, and IPsec. If an overlay tunnel, such as tunnel 148, is formed based on VXLAN, endpoints 102 and 104 can be VTEPs of tunnel 148.

In some embodiments, the underlying physical network can be an Ethernet and/or IP network, and a respective switch of network 100, such as switch 102, is an Ethernet switch and/or IP router. Under such a scenario, communication among the switches in the underlying physical network can be based on Ethernet and/or IP. The underlying physical network can also be a Gen-Z network, and a respective switch of network 100, such as switch 102, is a Gen-Z component. A Gen-Z network can be a memory-semantic fabric that can be used to communicate to the devices in a computing environment.

In this example, tunnel 122 can be established between endpoints 102 and 106 based on a tunneling protocol and extend a layer-2 network across layer-3 domains. To forward traffic to tunnel 122, endpoint 106 may encapsulate a packet using a tunnel encapsulation header. Endpoint 106 can include a set of inter-switch ports, such as port 142, and a set of host ports, such as port 144. Endpoint 106 can be coupled to switch 102 using inter-switch port 142. Consequently, endpoint 106 can form tunnel 122 with peer endpoint 102 and forward traffic to endpoint 102 via inter-switch port 142. On the other hand, endpoint 106 can be coupled to host 116 via host port 144. Endpoint 106 can receive a join request 132 for a multicast group 152 from host port 144.

With existing technologies, multicast snooping can be enabled for network 100. As a result, a respective endpoint, such as endpoint 106, can identify a multicast packet of a multicast group and forward the packet to the segment of network 100 where there are subscriber hosts for the multicast group. In this way, multicast snooping can restrict multicast traffic flow to the relevant network segments and facilitate effective utilization of available bandwidth in network 100. When multicast snooping is enabled, network 100 can include a querier, which can be switch 102. Therefore, switch 102 can also be referred to as querier 102. Querier 102 can obtain join request 132 for multicast group 152 from endpoint 106 and send join request 132 toward source 110 of multicast group 152 through switch 104. Since endpoint 104 is coupled to source 110, endpoint 104 can be referred to as a source endpoint for multicast group 152. Querier 192 may also receive membership reports from hosts participating in multicast group 152.

Since querier 102 can send join request 132 for multicast group 152 to source 110, a corresponding multicast packet 134, which can include data belonging to the data stream of multicast group 152, can be directed to querier 110. Upon receiving packet 134, querier 110 can forward packet 134 to endpoint 106. However, endpoint 102 can be coupled to endpoints 104 and 106 via tunnels 128 and 122, respectively. Hence, source 110, querier 102, and requesting host 116 can be spread across different layer-2 segments separated by underlying layer-3 domains. Consequently, querier 102 may receive packet 134 from source 110 via tunnel 128, and may need to forward packet 134 to another tunnel 122 toward host 116 (e.g., through endpoint 106). However, to prevent loops across endpoints, forwarding between tunnels 128 and 122 may operate based on split-horizon rules, which can block traffic received from tunnel 128 to tunnel 122. As a result, with split-horizon rules in operation, querier 102 may not forward packet 134 to host 116. This can cause a multicast traffic black hole in network 100.

To solve this problem, a respective endpoint in network 100 can support comprehensive forwarding of multicast control traffic and selective forwarding of multicast data traffic. A respective endpoint can maintain can store a database in the local storage device. For example, endpoint 106 can include a database 182, which can be a relational database specialized for deploying in a switch. Endpoint 106 can maintain the virtual network identifiers, such as VNIs, tunnel information, and associated port configuration in database 182. Endpoint 106 can also include a multicast processing logic block 184, which can be a multicast daemon running on endpoint 106. Logic block 184 can obtain the tunneling information from database 182. This allows endpoint 106 to process multicast control and data traffic based on the tunnel configurations.

When querier 102 is configured for network 100, querier 102 can send an AHQ to inter-switch ports configured with an associated VLAN. In this example, a respective tunnel in network 100 may correspond to the same VLAN. Therefore, a respective tunnel can be configured with a same virtual network identifier (e.g., a VXLAN network identifier (VNI)). For a different VLAN, the tunnels in network 100 may be represented by another virtual network identifier (i.e., another VNI). For each VLAN, querier 102 may send a separate AHQ. Since the AHQ is sent to the inter-switch ports, the AHQ is sent to the tunnels.

Upon receiving the AHQ, endpoint 106 can mark inter-switch port 142 as a querier port. Endpoint 106 can then maintain information indicating the ports via which traffic belonging to multicast group 152 can be accessible. Similarly, a respective peer endpoint can mark the ingress inter-switch port of the AHQ as the querier port and maintain information indicating the multicast group's traffic source. Upon receiving join request 132 from host port 144, endpoint 106 may identify join request 132 by performing multicast snooping. Endpoint 106 can then mark host port 144 for forwarding multicast traffic belonging to multicast group 152. To do so, endpoint 106 can determine that port 144 is a subscriber port for multicast group 152, and maintain a multicast forwarding table that maps respective identifiers of multicast group 152 and host port 144.

The endpoint can then forward join request 132 to querier port 142, a set of detected ports, administratively configured forwarding ports, and all ports that participate a tunnel. As a result, even if a peer endpoint is not in the multicast tree of multicast group 152, endpoint 106 can forward join request 132 to tunnels 122, 124, and 126. Upon receiving join request 132 from tunnel 126, endpoint 104 can track multicast group 152 and tunnel information for tunnel 126. For example, endpoint 104 can maintain a mapping between a tunnel identifier of tunnel 126 and a group identifier of multicast group 152. In some embodiments, the tunnel identifier can include one or more of: the IP addresses of the two endpoints of the tunnel and a virtual network identifier (e.g., a VNI). The mapping may also include a port identifier of an inter-switch port 146 of endpoint 104 that participates in tunnel 126.

The mapping may allow endpoint 104 to determine via which tunnel a join request for a particular multicast group has been received. For example, based on the mapping, endpoint 104 can determine that a join request for multicast group 152 has been received from tunnel 126. Consequently, when endpoint 104 receives packet 134 comprising multicast traffic for multicast group 152 from source 110 via host port 148, endpoint 104 can forward packet 134 to tunnel 126 because join request 132 has been received from this tunnel. Endpoint 104, thus, can prevent the flow of multicast traffic to unassociated tunnels. Upon receiving packet 134 from tunnel 126, endpoint 106 can forward the packet to host port 144 based on the multicast forwarding table entry generated based on join message 132.

It should be noted that endpoint 104 may also forward packet 134 to querier 102 using tunnel 128 even if querier 102 is not locally coupled to a host subscribing to multicast group 152 (e.g., even if host 112 is not a subscriber). To restrict the distribution of multicast queries and data packets, and prevent looping of packets in the mesh topology of network 100, a respective endpoint in network 100 can deploy split-horizon rules. As a result, even if querier 102 receives join request 132 from tunnel 122, respectively, querier 102 may not forward join request 132 to another tunnel, such as tunnel 128 (denoted with a cross). Consequently, even when endpoint 106 forwards join request 132 to each peer endpoint in network 100, the peer endpoint would not forward that join request to another tunnel. Similarly, even when querier 102 receives packet 134 from tunnel 128, querier would not forward packet 134 to another tunnel, such as tunnel 122 (denoted with a cross).

Similar to join requests, to leave multicast group 152, host 116 may send a multicast leave request 136 for multicast group 152. Upon receiving leave request 136 from host port 144, endpoint 106 can forward leave request 136 to a respective peer endpoint via a corresponding tunnel. This allows the peer endpoints to stop tracking multicast group 152 that may not have a subscriber host, such as host 116. Unless another subscriber host is reachable via tunnel 126, endpoint 104 may no longer forward data traffic to tunnel 126.

Furthermore, upon receiving leave request 136, querier 102 can send GSQ and/or GSSQ packets for multicast group 152 to a respective tunnel. If any other hosts remain in multicast group 152, the host can send a membership report, thereby notifying the corresponding endpoint that multicast traffic should continue to flow to that endpoint. The join and leave requests, such as requests 132 and 136, are infrequent and small, and data packets, such as packet 134, are frequent and large. Hence, comprehensive forwarding for join and leave requests may introduce little overhead in network 100, while selective forwarding for data traffic can preserve network bandwidth. In this way, the endpoints in network 100 can ensure efficient multicast traffic forwarding.

Figure 1B:
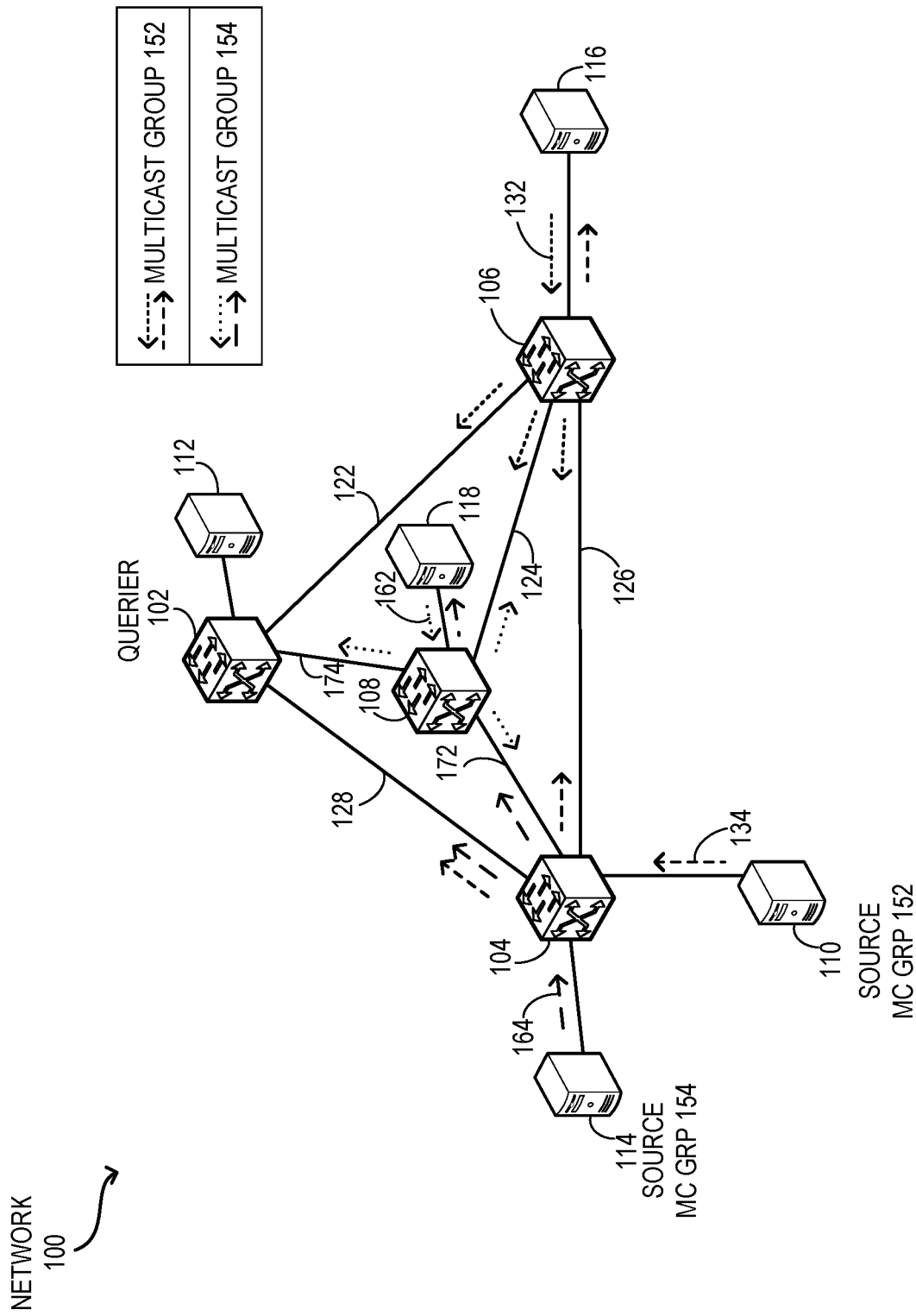
FIG. 1B illustrates an exemplary network supporting efficient multicast forwarding across overlay tunnels for a plurality of multicast groups, in accordance with an embodiment of the present application.

In network 100, the endpoints can perform the comprehensive forwarding of multicast control traffic and selective forwarding of multicast data traffic for an individual multicast group. Therefore, an endpoint may forward traffic for one multicast group to one tunnel while forwarding traffic to another tunnel for another multicast group. FIG. 1B illustrates an exemplary network supporting efficient multicast forwarding across overlay tunnels for a plurality of multicast groups, in accordance with an embodiment of the present application. During operation, upon receiving a join request 162 for multicast group 154 from host 118, endpoint 108 can then forward join request 162 to a respective peer endpoint via a corresponding tunnel.

As a result, even if a peer endpoint is not in the multicast tree of multicast group 154, endpoint 108 can forward join request 162 to tunnels 172, 174, and 124. Upon receiving join request 162 from tunnel 172, endpoint 104 can track multicast group 154 and tunnel information for tunnel 172. Consequently, when endpoint 104 receives packet 164 comprising multicast traffic for multicast group 154 from source 114, endpoint 104 can forward packet 164 to tunnel 172 because join request 162 has been received from this tunnel. Endpoint 104 may also forward packet 164 to querier 102 via tunnel 128 even if querier 102 is not locally coupled to a host subscribing to multicast group 154.

Here, endpoint 104 may not forward packet 164 to tunnel 126 because endpoint 104 has not received any join request for multicast group 154 from tunnel 126. Similarly, endpoint 104 may not forward packet 134 to tunnel 172 because endpoint 104 has not received any join request for multicast group 152 from tunnel 172. Therefore, a respective endpoint in network 100 performs selective forwarding of multicast data traffic for individual multicast groups.

Figure 2:
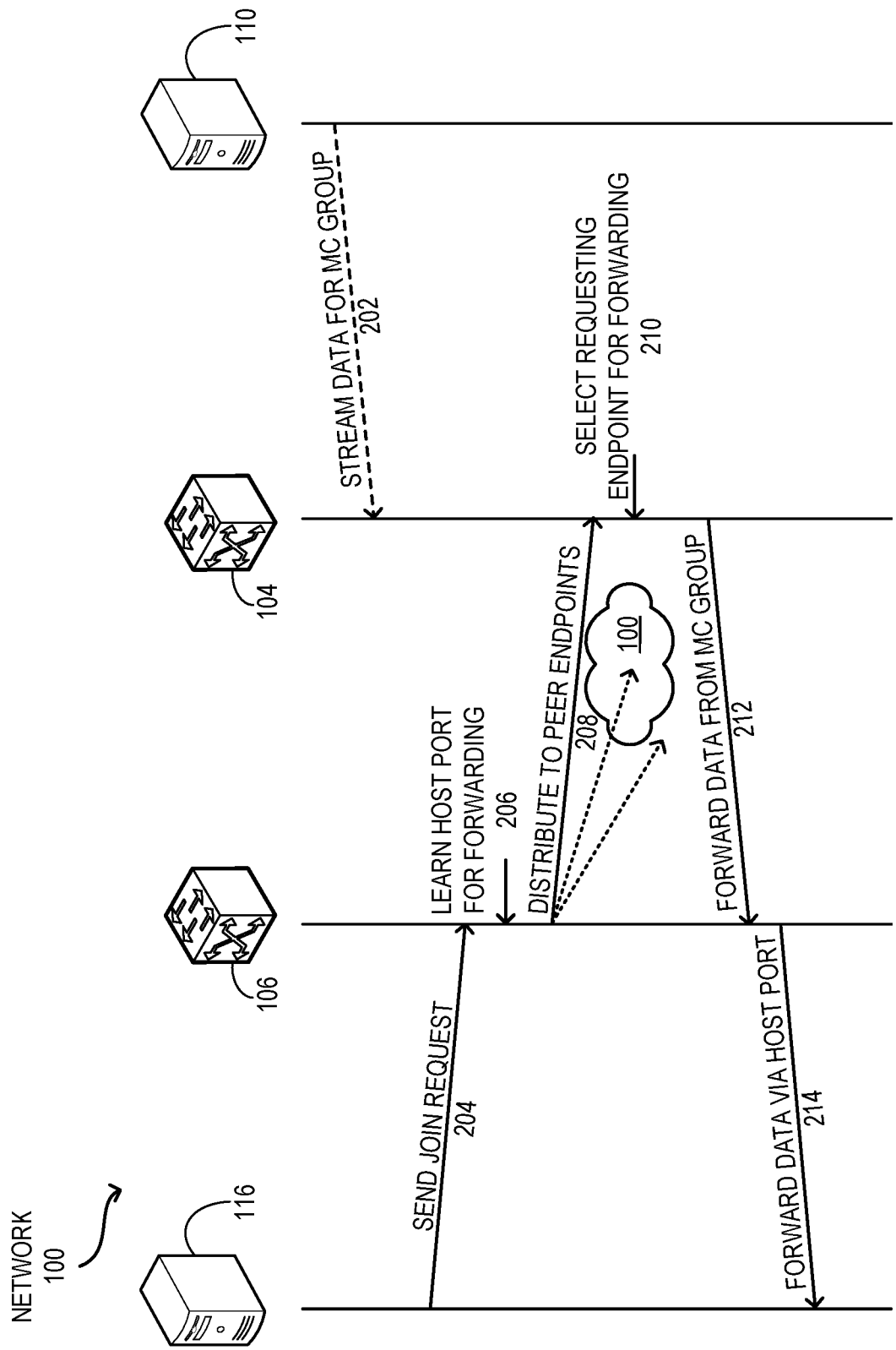
FIG. 2 illustrates an exemplary communication facilitating efficient multicast forwarding across overlay tunnels, in accordance with an embodiment of the present application.

FIG. 2 illustrates an exemplary communication facilitating efficient multicast forwarding across overlay tunnels, in accordance with an embodiment of the present application. During operation, source 110 can start streaming data for a multicast group (operation 202). To receive the multicast stream, host 116 can send a join request to endpoint 106 since host 116 is reachable through switch 106 in network 100. Endpoint 106 can learn the host port from which the join request has been received for subsequent forwarding of received multicast traffic (operation 206). Endpoint 106 can then distribute the join request to the peer endpoints in network 100 (operation 208). Consequently, endpoint 106 can send the join request to peer endpoint 104.

Based on the received join request, endpoint 104 can select requesting endpoint 106 for forwarding (operation 210). Endpoint 104 can then start forwarding data (e.g., data packets) from the multicast group to endpoint 106 (operation 212). It should be noted that endpoint 104 may continue to receive data stream for the multicast group prior to forwarding data to endpoint 106. Upon receiving the join request, endpoint 104 can start sending the multicast group's subsequent data packets to endpoint 106. If another endpoint sends a join request to endpoint 104, endpoint 104 can start sending subsequent data packets of the multicast group to that multicast group. Upon receiving the data for the multicast group, endpoint 106 can forward the data to host 116 via the learned host port (operation 214).

Figure 3:
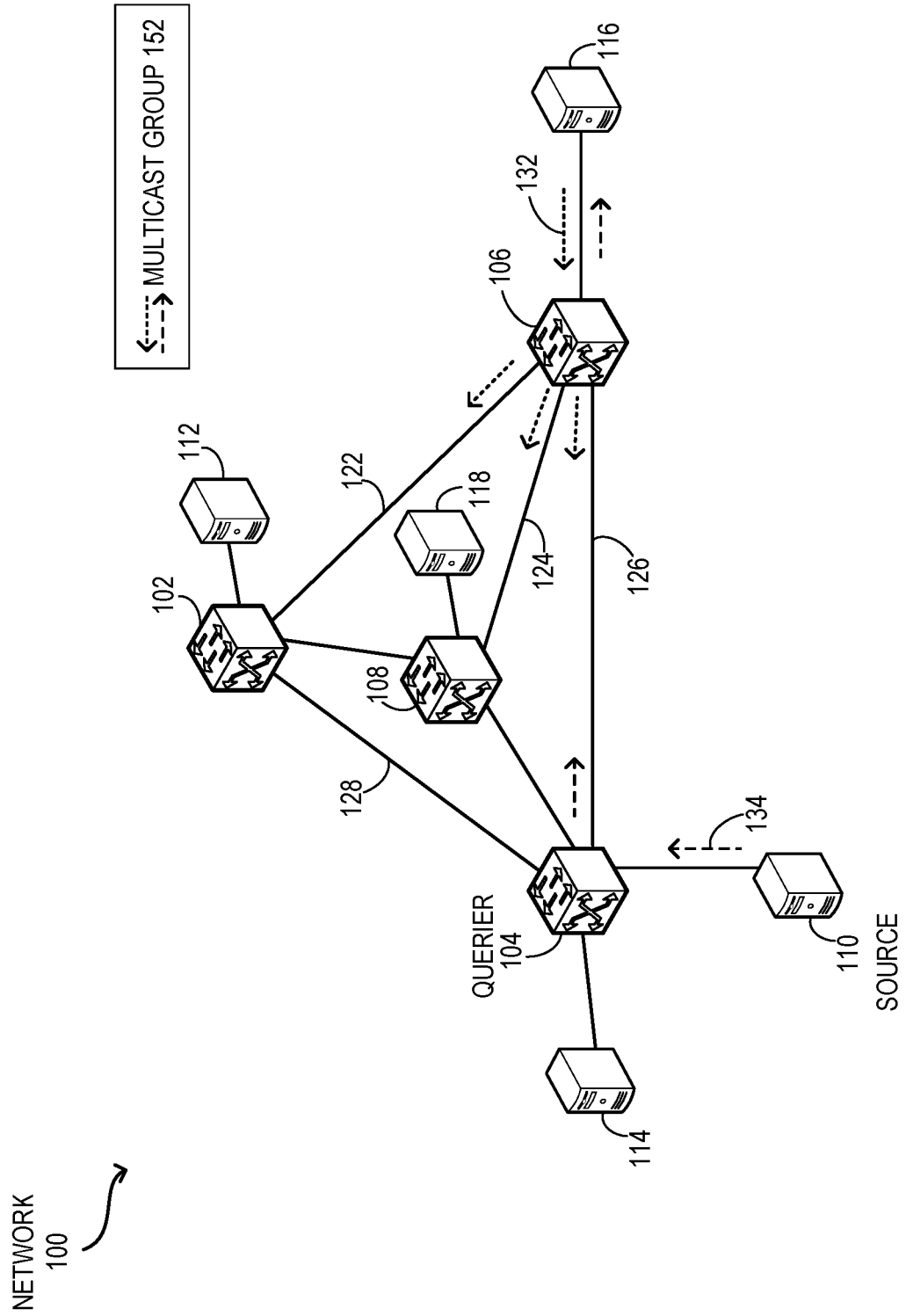
FIG. 3 illustrates an exemplary network supporting efficient multicast forwarding across overlay tunnels for a source coupled to a querier, in accordance with an embodiment of the present application.

FIG. 3 illustrates an exemplary network supporting efficient multicast forwarding across overlay tunnels for a source coupled to a querier, in accordance with an embodiment of the present application. To further increase bandwidth utilization in network 100, the querier in network 100 can be placed with the sources of multicast traffic. Because the source endpoint for a multicast group can also forward data traffic to the querier, the querier drops the traffic if the querier is not coupled to a subscriber. Consequently, the forwarded traffic unnecessarily occupies network capacity, which can include switching capacity and link bandwidth. In the example in FIG. 1A, endpoint 104 forwards packet 134 to querier 102, which is then dropped by querier 102. Therefore, data traffic from endpoint 104 to querier 102 unnecessarily occupies network capacity on tunnel 128, which can include a number of links and switches of the underlying physical network.

Typically, a plurality of switches in a network can be configured as a querier even though one of them can actively operate as the querier. To utilize this feature, a respective endpoint in network 100 can be equipped with a configuration that may allow the endpoint to operate the endpoint as a querier. Each endpoint can then deploy a distributed selection mechanism to independently determine which endpoint should operate as the querier. Since a respective endpoint in network 100 can receive the join and leave requests, the endpoint can determine which source endpoint serves how many hosts. Furthermore, the endpoints may periodically share performance parameters, such as link and node utilization, data rate associated with a multicast group for which the endpoint serves as a source endpoint, and residual capacity.

Based on the performance parameters, each endpoint can individually and periodically determine which endpoint should operate as the querier, thereby enhancing the bandwidth utilization in network 100. In this example, each endpoint in network 100 can individually determine that endpoint 104 should become the querier for network 100. If endpoint 104 becomes the querier for network 100, endpoint 104 does not need to forward data traffic over tunnel 128. As a result, the network capacity occupied by the data traffic of multicast group 152 on tunnel 128 can become available. In this way, by selecting the querier that may facilitate an efficient traffic distribution, the endpoints can further enhance the multicast traffic forwarding in network 100.

Operations

Figure 4A:
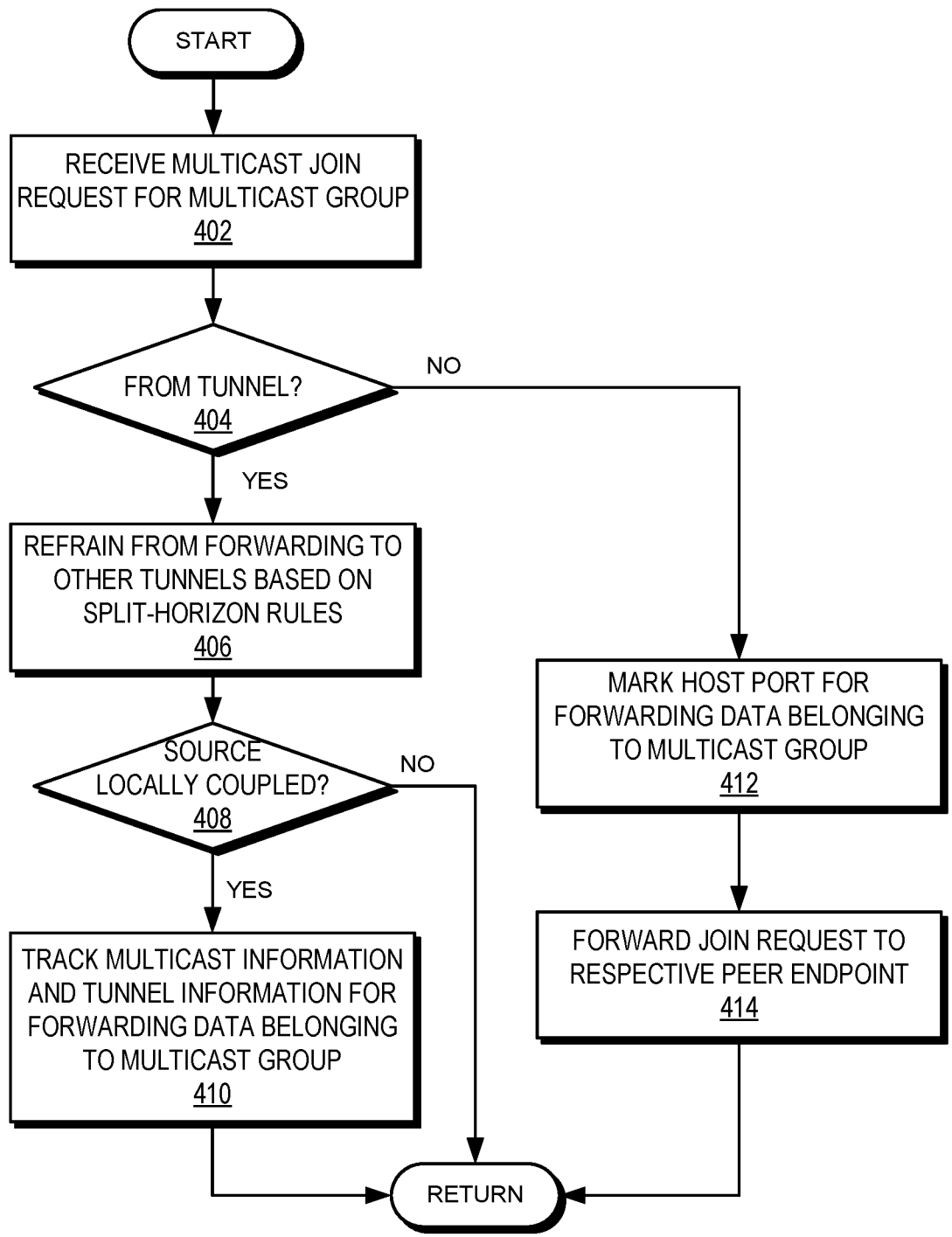
FIG. 4A presents a flowchart illustrating the process of a tunnel endpoint switch forwarding a multicast join request, in accordance with an embodiment of the present application.

FIG. 4A presents a flowchart illustrating the process of a tunnel endpoint switch forwarding a multicast join request, in accordance with an embodiment of the present application. During operation, the endpoint can receive a multicast join request for a multicast group (operation 402) and determine whether the join request has been received from a tunnel (operation 404). If the join request has been received from a tunnel, the endpoint can refrain from forwarding to other tunnels based on split-horizon rules (operation 406). The endpoint can then check whether the source of the multicast group is locally coupled (operation 408).

If the source of the multicast group is locally coupled, the source can be coupled to the endpoint via a host port. The endpoint can then track multicast information and tunnel information for forwarding data belonging to the multicast group (operation 410). On the other hand, if the join request has not been received from a tunnel, the join request has been received from a host port. The endpoint can then mark the host port for forwarding data belonging to the multicast group (operation 412) and forward the join request to a respective peer endpoint (operation 414).

Figure 4B:
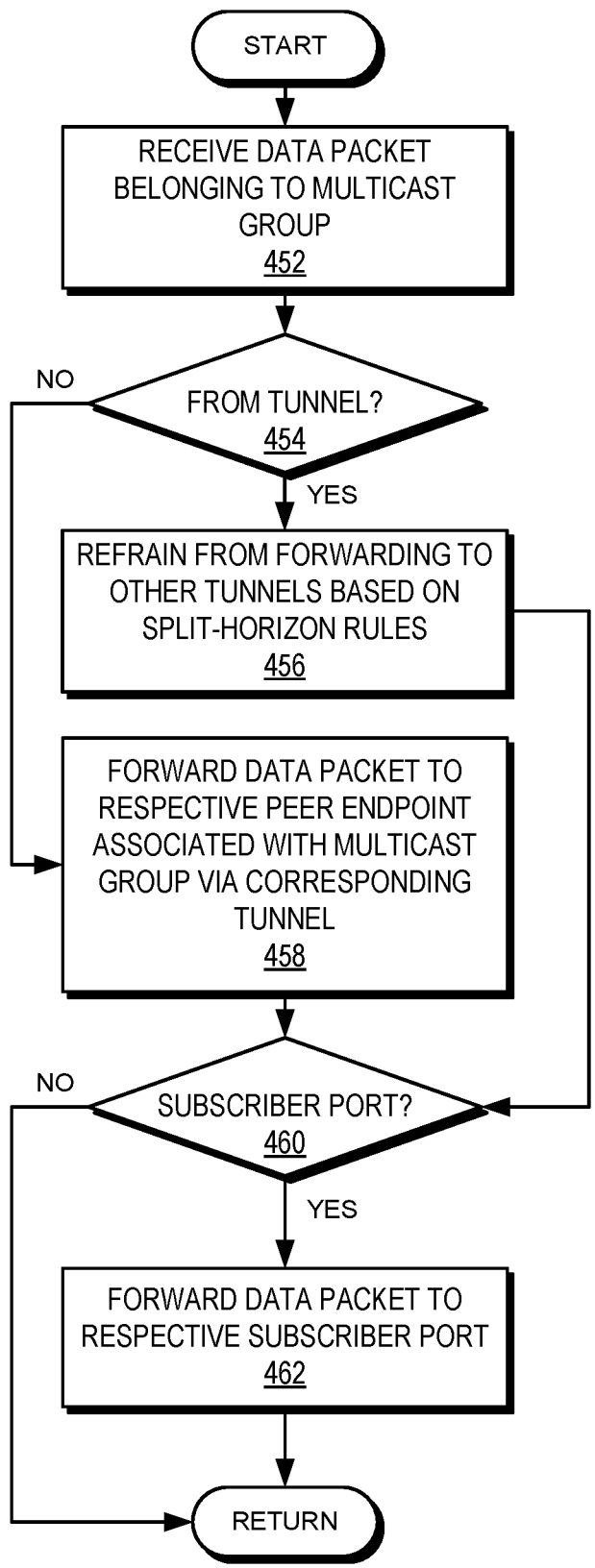
FIG. 4B presents a flowchart illustrating the process of a tunnel endpoint switch forwarding a multicast data packet, in accordance with an embodiment of the present application.

FIG. 4B presents a flowchart illustrating the process of a tunnel endpoint switch forwarding a multicast data packet, in accordance with an embodiment of the present application. During operation, the endpoint can receive a data packet belonging to the multicast group (operation 452) and check whether the packet has been received from a tunnel (operation 454). If the packet has been received from a tunnel, the endpoint can refrain from forwarding to other tunnel based on split-horizon rules (operation 456). On the other hand, if the packet has been received from a tunnel, the packet has been received from a host port. Under such circumstances, the packet can be received from the source of the multicast group.

The endpoint can then forward the data packet to a respective endpoint associated with the multicast group via a corresponding tunnel (operation 458). An endpoint can be associated with a multicast group if the endpoint is a querier or has sent a join request. Upon refraining from forwarding the packet (operation 456) or forwarding the packet to associated peer endpoints (operation 458), the endpoint can check whether there is a subscriber port for the multicast group (operation 460). The endpoint may check the multicast forwarding table to determine the presence of a subscriber port. If there is a subscriber port for the multicast group, the endpoint can forward the data packet to a respective subscriber port (operation 462).

Figure 5:
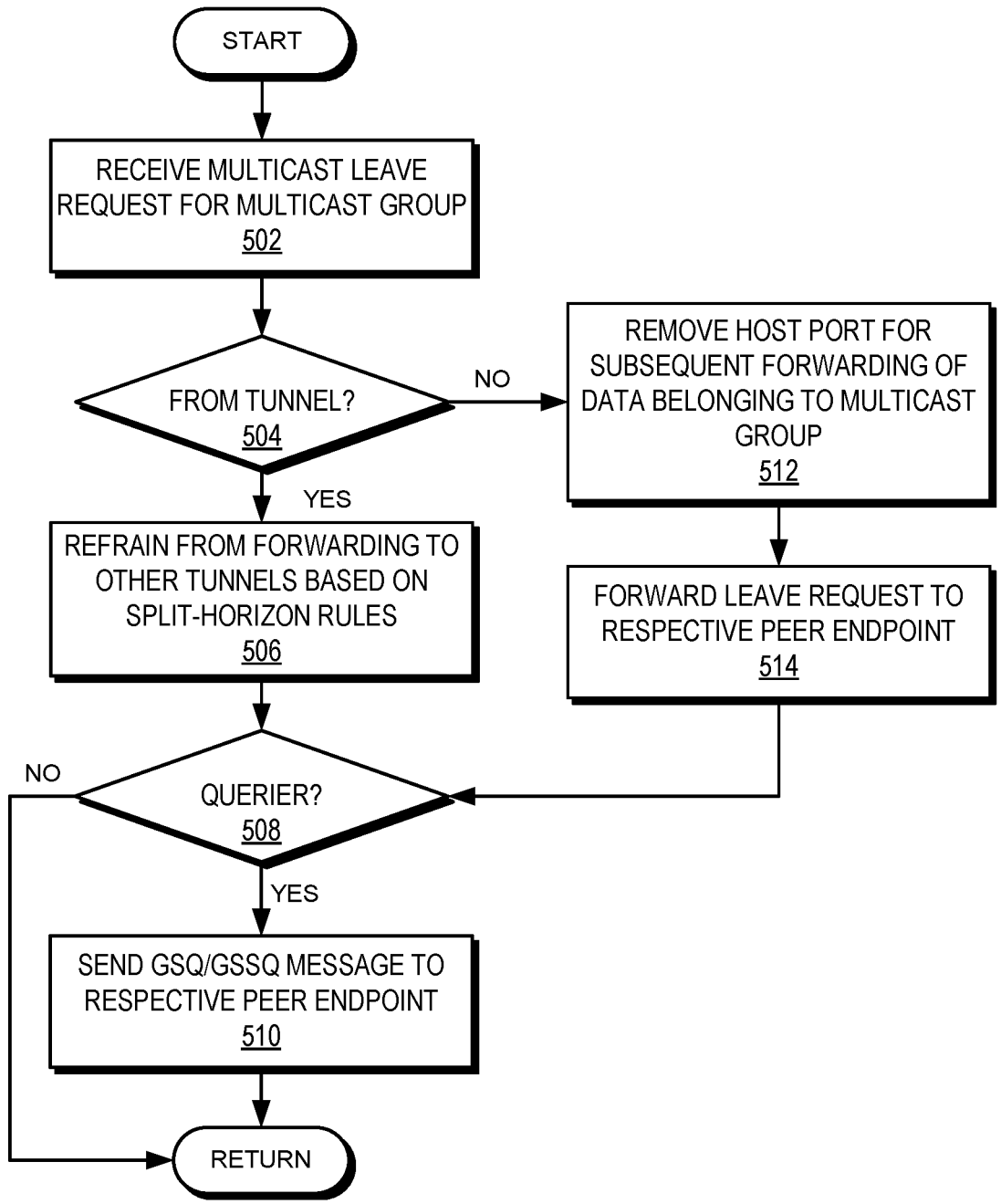
FIG. 5 presents a flowchart illustrating the process of a tunnel endpoint switch processing a multicast leave request, in accordance with an embodiment of the present application.

FIG. 5 presents a flowchart illustrating the process of a tunnel endpoint switch processing a multicast leave request, in accordance with an embodiment of the present application. During operation, the endpoint can receive a multicast leave request for a multicast group (operation 502) and determine whether the leave request has been received from a tunnel (operation 504). If the leave request has been received from a tunnel, the endpoint can refrain from forwarding to other tunnels based on split horizon rules (operation 506). On the other hand, if the leave request has not been received from a tunnel, the leave request has been received from a host port.

The endpoint can then remove the host port for subsequent forwarding of data belonging to the multicast group (operation 512) and distribute the join request to a respective peer endpoint (operation 514). Upon refraining from forwarding the leave message (operation 506) or forwarding the leave message to a respective peer endpoint (operation 514), the endpoint can determine whether the endpoint is the querier for the network (operation 508). If the endpoint is the querier for the network, the endpoint can send a GSQ or GSSQ message to a respective peer endpoint (operation 510).

Exemplary Switch System

Figure 6:
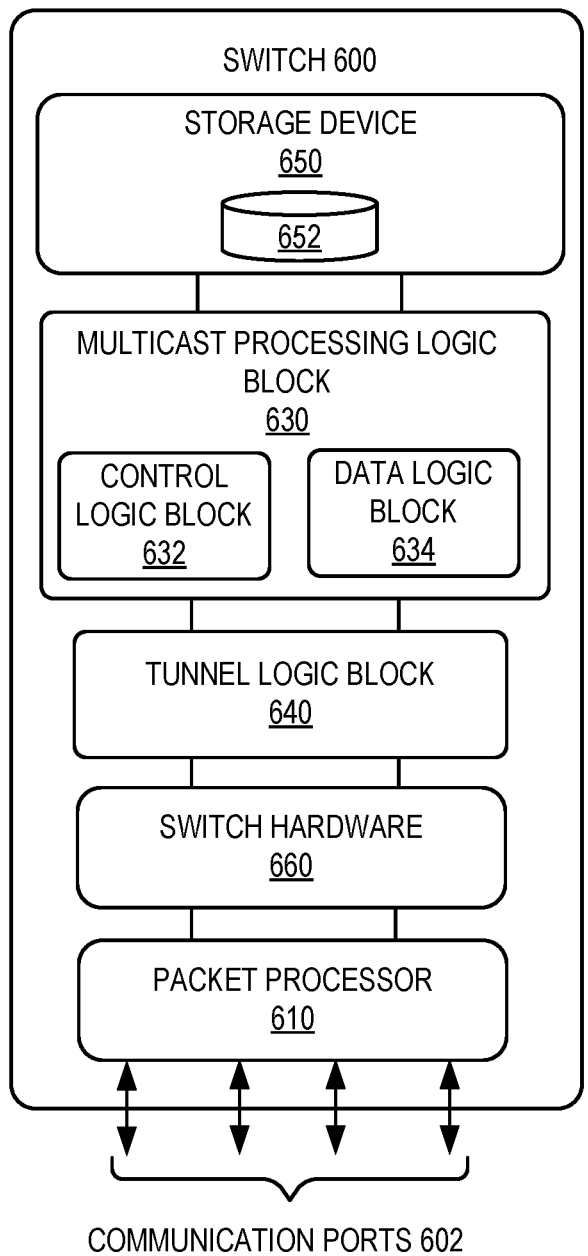
FIG. 6 illustrates an exemplary switch supporting efficient multicast forwarding across overlay tunnels, in accordance with an embodiment of the present application.

FIG. 6 illustrates an exemplary switch supporting efficient multicast forwarding across overlay tunnels, in accordance with an embodiment of the present application. In this example, a switch 600 includes a number of communication ports 602, a packet processor 610, a multicast processing logic block 630, a tunnel logic block 640, and a storage device 650. Switch 600 can also include switch hardware (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a media access control (MAC) address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets.

Switch 600 can maintain a database 652 (e.g., in storage device 650). Database 652 can be a relational database and may run on one or more DBMS instances. Switch 600 can maintain the virtual network identifiers, such as VNIs, tunnel information, and associated port configuration in database 652. Tunnel logic block 640 can establish a tunnel from switch 600 using one or more of communication ports 602 with a peer switch and exchange packets via the tunnel based on corresponding tunnel encapsulation. Hence, tunnel logic block 640 can allow switch 600 to operate as a tunnel endpoint.

Multicast processing logic block 630 can include a control logic block 632 and a data logic block 634. During operation, switch 600 can receive a multicast query (i.e., a control message) for a multicast group via one of communication ports 602. If the port is a host port, control logic block 632, in conjunction with packet processor 610, can forward the multicast query to a respective peer endpoint via a corresponding tunnel. On the other hand, if the port is an inter-switch port participating in a tunnel, control logic block 632 can refrain from forwarding the multicast query to any peer endpoint.

Switch 600 can also receive a multicast data packet via one of communication ports 602. If the port is a host port, data logic block 634, in conjunction with packet processor 610, can forward the multicast data packet to a set of peer endpoints associated with the multicast group via a corresponding tunnel. The set of peer endpoints can include a querier in the network, and one or more peer endpoints from which switch 600 has received a join request for the multicast group. On the other hand, if the port is an inter-switch port participating in a tunnel, data logic block 634 can refrain from forwarding the multicast query to any peer endpoint.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating multicast forwarding via overlay multicast tunnels in a network, comprising:
   receiving, by a first tunnel endpoint, a join request for a multicast group via a first overlay tunnel between the first tunnel endpoint and a second tunnel endpoint;
   identifying a local port of the first tunnel endpoint associated with the multicast group indicated by the join request;
   including the first overlay tunnel in a set of forwarding tunnels for multicast traffic of the multicast group based on the join request, wherein the set of forwarding tunnels includes:
   a tunnel to a querier for multicast snooping in the network; and
   one or more tunnels from which a multicast join request for the multicast group have been received; and
   forwarding the multicast traffic of the multicast group received from the local port via the set of forwarding tunnels, thereby limiting forwarding of the multicast traffic to tunnel endpoints associated with the multicast group.

2. The method of claim 1, further comprising receiving data traffic of the multicast group from the local port from a source of the multicast group.

3. The method of claim 1, further comprising:
   receiving, by the first tunnel endpoint, a second join request for a second multicast group from a multicast subscriber host via a local port; and
   forwarding the second join request to a respective peer tunnel endpoint of the first tunnel endpoint via a corresponding tunnel.

4. The method of claim 1, further comprising obtaining information associated with the first overlay tunnel from a relational database of the first tunnel endpoint.

5. The method of claim 1, wherein the multicast join is based on one of:
   an Internet Group Management Protocol (IGMP); and
   a Multicast Listener Discovery (MLD) protocol.

6. The method of claim 1, further comprising:
   selecting the first tunnel endpoint as a querier based on a set of performance parameters associated with the multicast group and the first tunnel endpoint; and
   configuring the first tunnel endpoint as the querier for the network.

7. The method of claim 1, further comprising maintaining an individual set of forwarding tunnels for a respective multicast group.

8. The method of claim 1, further comprising:
   generating an entry in a multicast forwarding table of the first tunnel endpoint in response to receiving the join request, wherein the entry comprises tunnel information associated with the first overlay tunnel; and
   identifying the set of forwarding tunnels based on the multicast forwarding table.

9. The method of claim 1, further comprising:
   receiving, by the first tunnel endpoint, a leave request for the multicast group via the first overlay tunnel;
   determining whether a subscriber host of the multicast group is reachable via the first overlay tunnel; and
   in response to no subscriber host of the multicast group being reachable via the first overlay tunnel, removing the first overlay tunnel from the set of forwarding tunnels.

10. A computer system for facilitating multicast forwarding via overlay multicast tunnels in a network, comprising:
    a processor;
    a non-transitory computer-readable storage medium storing instructions, which when executed by the processor causes the processor to perform a method, the method comprising:
    receiving a join request for a multicast group via a first overlay tunnel between the computer system and a remote computer system, wherein the computer system and the remote computer system operate as tunnel endpoints of the first overlay tunnel;
    identifying a local port of the computer system associated with the multicast group indicated by the join request;
    including the first overlay tunnel in a set of forwarding tunnels for multicast traffic of the multicast group based on the join request, wherein the set of forwarding tunnels includes:
    a tunnel to a querier for multicast snooping in the network; and
    one or more tunnels from which a multicast join request for the multicast group have been received; and
    forwarding the multicast traffic of the multicast group received from the local port via the set of forwarding tunnels, thereby limiting forwarding of the multicast traffic to tunnel endpoints associated with the multicast group.

11. The computer system of claim 10, wherein the method further comprises receiving data traffic of the multicast group from the local port from a source of the multicast group.

12. The computer system of claim 10, wherein the method further comprises:
    receiving a second join request for a second multicast group from a multicast subscriber host via a local port; and
    forwarding the second join request to a respective peer tunnel endpoint of the computer system via a corresponding tunnel.

13. The computer system of claim 10, wherein the method further comprises obtaining information associated with the first overlay tunnel from a relational database of the computer system.

14. The computer system of claim 10, wherein the multicast join is based on one of:
    an Internet Group Management Protocol (IGMP); and
    a Multicast Listener Discovery (MLD) protocol.

15. The computer system of claim 10, wherein the method further comprises:
    selecting the computer system as a querier based on a set of performance parameters associated with the multicast group and the computer system; and
    configuring the computer system as the querier for the network.

16. The computer system of claim 10, wherein the method further comprises maintaining an individual set of forwarding tunnels for a respective multicast group.

17. The computer system of claim 10, wherein the method further comprises:
    generating an entry in a multicast forwarding table of the computer system in response to receiving the join request, wherein the entry comprises tunnel information associated with the first overlay tunnel; and identifying the set of forwarding tunnels based on the multicast forwarding table.

18. The computer system of claim 10, wherein the method further comprises:

receiving, by the computer system, a leave request for the multicast group via the first overlay tunnel;

determining whether a subscriber host of the multicast group is reachable via the first overlay tunnel; and in response to no subscriber host of the multicast group being reachable via the first overlay tunnel, removing the first overlay tunnel from the set of forwarding tunnels.

* * * * *